(12) United States Patent
Winsor

(10) Patent No.: US 7,784,274 B2
(45) Date of Patent: Aug. 31, 2010

(54) COMPACT SYSTEM FOR ADDING HYDROCARBONS TO THE EXHAUST OF AN INTERNAL COMBUSTION ENGINE

(75) Inventor: Richard Edward Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 611 days.

(21) Appl. No.: 11/748,891

(22) Filed: May 15, 2007

(65) Prior Publication Data

US 2008/0282676 A1 Nov. 20, 2008

(51) Int. Cl.
*F01N 3/00* (2006.01)
(52) U.S. Cl. .............................. 60/286; 60/274; 60/280; 60/303; 60/605.2; 60/607; 60/617; 60/618
(58) Field of Classification Search .................. 60/274, 60/280, 296, 295, 303, 605.1, 605.2, 605.3, 60/606, 607, 616, 617, 618
See application file for complete search history.

(56) References Cited

U.S. PATENT DOCUMENTS

| | | | |
|---|---|---|---|
| 4,018,053 A * | 4/1977 | Rudert et al. .................. 60/606 |
| 4,977,862 A * | 12/1990 | Aihara et al. ............. 123/41.12 |
| 5,697,211 A * | 12/1997 | Kawaguchi ............... 60/39.512 |
| 6,883,308 B2 * | 4/2005 | Megas et al. ................... 60/280 |
| 6,895,745 B2 * | 5/2005 | Roby ........................... 60/280 |
| 6,935,100 B2 * | 8/2005 | Miura .......................... 60/284 |
| 7,191,589 B2 * | 3/2007 | Yasui et al. .................... 60/284 |
| 2004/0194447 A1 | 10/2004 | Roby | |

FOREIGN PATENT DOCUMENTS

| | | |
|---|---|---|
| EP | 1767755 | 3/2007 |
| WO | 0196718 | 12/2001 |
| WO | 2006029808 | 3/2006 |

\* cited by examiner

*Primary Examiner*—Binh Q. Tran

(57) ABSTRACT

A compact system for introducing hydrocarbons in the form of engine fuel into the bearing housing for a turbocharger adjacent the turbine wheel shaft. The hydrocarbons are directed outward by centrifugal force and are vaporized by the heat of the impeller. As a result the hydrocarbons are available substantially immediately after the turbine to interact with a catalyst to increase the temperature of the exhaust stream for regeneration of a diesel particulate filter.

13 Claims, 2 Drawing Sheets

COMPACT SYSTEM FOR ADDING HYDROCARBONS TO THE EXHAUST OF AN INTERNAL COMBUSTION ENGINE

FIELD OF THE INVENTION

The present invention relates to internal combustion engines and more specifically for exhaust aftertreatment of such engines.

BACKGROUND OF THE INVENTION

The Environmental Protection Laws enacted in the United States decades ago have imposed ever increasing limits on permitted emissions from internal combustion engines. The diesel engine has enjoyed a position of being a durable and fuel efficient engine thus making it the engine of choice for commercial, industrial and agricultural use. As emissions limits have been lowered, it becomes increasingly more difficult to meet the standards with a diesel engine.

The most recent standards require diesel particulate filters (DPF) to remove particulate matter from the exhaust of a diesel engine before it is transmitted to the environment. While these filters do an effective job of removing particulate matter from the exhaust, they require periodic cleaning. This entails increasing the exhaust temperature to around 600° C. at which point the carbon particles trapped by the filter combust and in effect provide a cleaning of the filter. Since the exhaust temperature of a diesel engine is significantly lower than 600° C., owing to its inherent efficiency, means must be provided for temporarily increasing the exhaust temperature. A preferred method for achieving this elevated temperature is to pass hydrocarbons over a catalytic converter to increase the temperature of the exhaust mixture to the required level.

There are two primary approaches to adding necessary hydrocarbons to the exhaust. One method involves utilizing the engine controller to inject excess fuel into the engine cylinder at a time when it will not burn so that the fuel is exhausted with the normal products of combustion and flows to the catalytic converter. While this method provides good mixing of the hydrocarbons and the exhaust stream, it usually promotes undesirable leakage of the fuel into the engine lubricating oil, resulting in adverse consequences.

The second approach for adding hydrocarbons to the exhaust involves injecting a fuel spray into the exhaust flow downstream of the main engine and its immediate components, such as a turbocharger utilized. This approach avoids the problem of fuel dilution in the engine lubricant. However, it creates new problems in that adequate time and distance must be provided to ensure complete mixing of the hydrocarbons in the exhaust stream prior to the time it passes over the catalytic converter. Typically, it is considered that up to one meter in length is needed to permit adequate mixing. In many instances the engine installation is such that one meter of an exhaust line prior to the catalytic converter is extremely difficult to accommodate.

What is needed in the art therefore, is a compact system for adding hydrocarbons to the exhaust stream of an internal combustion engine without the problems of oil dilution.

SUMMARY OF THE INVENTION

In one form, the invention involves an internal combustion engine system having an air breathing, fuel consuming, internal combustion engine for producing a power output and having an air intake system and an exhaust system for receiving the products of combustion. A turbomachine having at least a turbine over which products of combustion passes directs exhaust gases to an aftertreatment system that has at least a catalyst. A device is provided to periodically introduce hydrocarbons adjacent the turbocharger turbine so that the heat of the turbine vaporizes the hydrocarbons whereby the products of combustion entering the exhaust aftertreatment system are substantially immediately available to interact with the catalyst.

In another form, the invention involves a method of adding hydrocarbons to the exhaust of an air breathing, fuel consuming internal combustion engine that has at least a turbine receiving the exhaust from the internal combustion engine. The method entails the steps of periodically directing hydrocarbons adjacent the turbine and into the exhaust for vaporizing the hydrocarbons and immediately after the turbine interacting the exhaust, including the vaporized hydrocarbons, with a catalyst to increase the temperature of the exhaust.

DETAILED DESCRIPTION OF THE INVENTION

Figure 1:
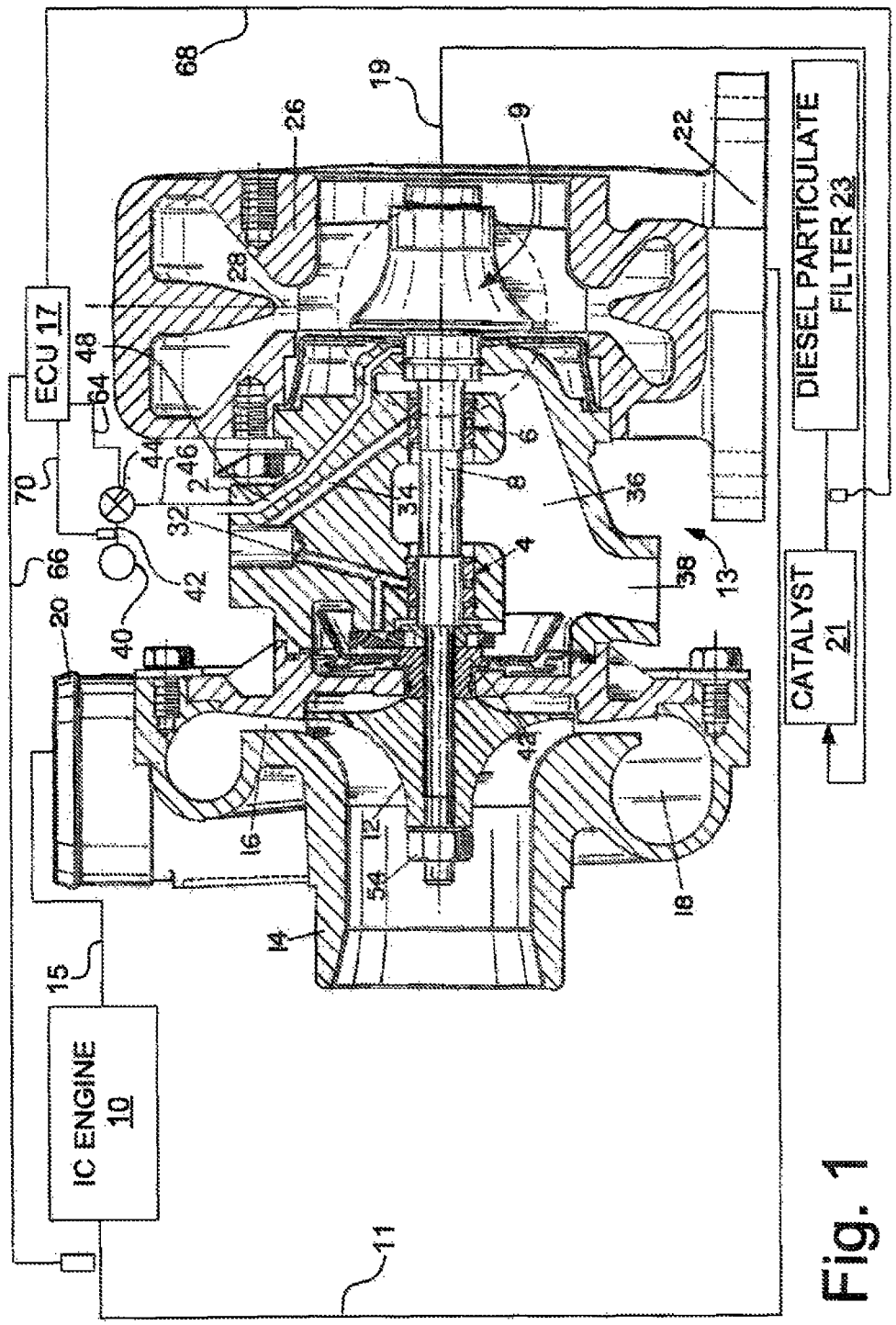
FIG. 1 shows an internal combustion engine system embodying the present invention.

Referring to FIG. 1, the internal combustion engine system includes an internal combustion engine 10, herein illustrated as a compression ignition engine in which the heat of compression is used to ignite a fuel charge metered to the engine 10 in quantities and at timings commanded by an electronic control unit (ECU) 17. As herein illustrated, an ECU 17 is utilized to control an exhaust aftertreatment system, described later, as well as control of the engine. It should be apparent, however, to those skilled in the art that a multiplicity of ECU's may be employed to control the various functions within the internal combustion engine system.

The products of combustion from internal combustion engine 10 are directed by an exhaust line 11 to a turbocharger, generally indicated by reference character 13. The turbocharger 13 is a well known component that utilizes otherwise unused energy from the exhaust of the internal combustion engine 10 to pressurize air for delivery to the intake of the engine via intake line 15. Exhaust products that have passed through the turbocharger 13 are delivered to an exhaust line 19 where they pass over a catalyst 21 and diesel particulate filter 23 before being discharged to the atmosphere.

As stated previously, the diesel particulate filter 23 collects carbonaceous particles that are emitted from the internal combustion engine 10. These particles accumulate on the filter media so that periodic cleaning or regeneration is required. This regeneration involves raising the temperature of the in the exhaust line 19 upstream of the diesel particulate filter to around 600° C., at which point the carbon particles burn off and clear the filter for continued trapping of diesel particulates. The catalyst 21 plays a roll in selectively elevating the exhaust temperature in that it promotes a chemical reaction when additional hydrocarbons are added to exhaust line 19 to elevate the temperature to about the required 600° C.

In accordance with the present invention a compact system for adding hydrocarbons is provided. The turbocharger 13 plays an important roll in contributing to this efficient system. The turbocharger 13 is a particular form of turbomachine in which a centrifugal compressor is driven by a centrifugal turbine to pressurize the intake air to an internal combustion engine to a level higher than atmospheric. It should be apparent, however, to those skilled in the art that the turbomachine may utilize other forms of impellers and compressors. Furthermore, it should be noted that the turbomachine may consist of a turbine as in the case of a turbo compound engine where exhaust gases are passed over a power turbine to retrieve some of the exhaust energy for application to the engine output.

The turbocharger 13 is characterized by a central bearing housing 2 that serves as the structural connector for the turbocharger. The housing 2 has floating sleeve bearings 4 and 6 to journal a central shaft 8. The shaft 8 is secured to a turbine 9 at one end and a compressor impeller 12 at the opposite end. The compressor impeller 12 receives air through an intake 14 and pressurizes it for delivery to a diffuser 16, volute 18 and then to an outlet 20 which connects to engine intake 15.

Turbine 9 is positioned within a turbine housing 26 having flange 22 connected to engine exhaust line 11. Housing 26 has an annular inlet 28 directing products of combustion from line 11 radially inward past the vanes on turbine 9 to produce a rotary output driving compressor 12.

The bearings 4 and 6 for turbine shaft 8 are supplied with lubricant, usually the same lubricant as supplied to internal combustion engine 10 via inlet port 30 and passages 32 and 34. The lubricant passing to the bearings 4 and 6 provides a thin film between the bearings and the housing 2 as well as the shaft 18. The lubricant passing through passages 32 and 34 and out of bearings 4 and 6 is discharged into a chamber 36 within housing 2 and finally to outlet 38 for connection to the sump of the engine for reuse in lubricating the engine 10 as well as the turbocharger 13. Not only does the lubricant provide a means for journaling shaft 8 but it also has a cooling function in that it carries excess heat away from the housing 2 to the engine sump via outlet 38 where it is appropriately cooled for engine utilization.

Figure 2:
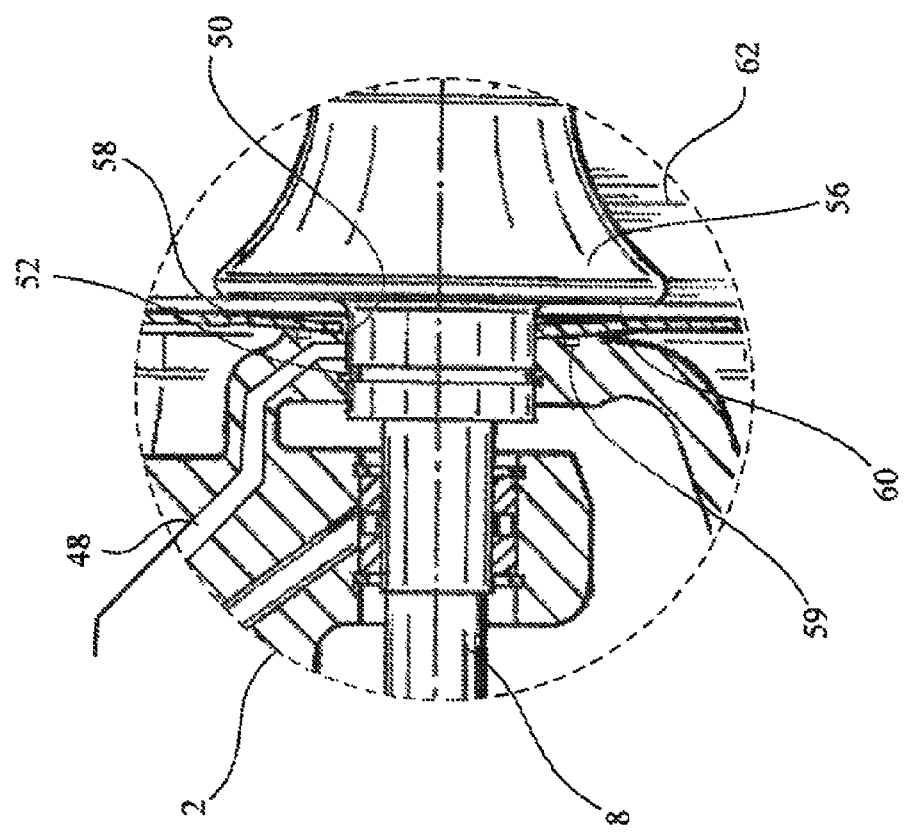
FIG. 2 is a highly enlarged fragmentary view of a portion of the internal combustion engine system of FIG. 1.

The hydrocarbons that are passed to the system for purposes of interacting with catalyst 21 begin in a fuel supply 40, usually the fuel supply for the engine 10. The fuel passes through line 42 past valve 44 to line 46 which connects with passage 48 within housing 2. The passage 48, as shown in greater detail in FIG. 2, follows a circuitous path to an outlet 50 between a shaft seal 52 for shaft 8 and the hub 56 for turbine 9. A heat shield 58 extends between hub 56 and housing 2 and a high temperature seal 59 may be provided between heat shield 58 and housing 42 adjacent outlet 50. Fuel that passes from outlet 50 between seal 52 and hub 56 passes up the back face 60 of hub 56 by centrifugal force and it is heated and vaporized and passes into the air flow generated by turbine blades 62 where it is thoroughly mixed with the exhaust flow by the time it passes into line 19.

The delivery of fuel to passage 48 through valve 44 is controlled by signal line 64 extending to ECU 17 in response to various signal inputs from lines 66 sensing the exhaust from internal combustion engine 10, line 68 sensing a temperature at the inlet of diesel particulate filter 23 and the pressure in line 42 via signal line 70.

In operation, the exhaust aftertreatment system is programmed to regenerate the diesel particulate filter at periodic intervals in response to selected operating parameters. When this operation is necessary, the ECU 17 sends a signal to valve 44 allowing passage of fuel from the fuel supply 40 through passage 48 to outlet 50 where it passes along turbine shaft 8 and onto the backside 60 of hub 56. The heat of hub 56 causes the fuel to be vaporized while at the same time centrifugal force urges the vaporized fluid outward where it enters into the air stream passage through the turbine blades 62 where it is thoroughly mixed prior to entry into exhaust line 19. While exhaust line 19 has a finite length in the schematic view of FIG. 1, in practice it has almost an immediate availability for mixing with catalyst 21 to increase the exhaust. The delivery of the fuel through passage 48 ensures that it will not coke because the central housing 2 for the turbocharger 13 is a significant heat sink and source of coolant by virtue of the continuous flow of lubricant. As a result, coking is minimized, if not eliminated. By passing the flow into housing 2 from an elevated position as shown in FIG. 1, gravity will assist when the flow is terminated to ensure that all the fuel is exhausted from passage 48. The benefit of such an arrangement is a compact system with substantially immediate availability for interaction between the hydrocarbons and catalyst without the problems of lubricant dilution for engine 10.

Having described the preferred embodiment, it will become apparent that various modifications can be made without departing from the scope of the invention as defined in the accompanying claims.

The invention claimed is:

1. An internal combustion engine system comprising:
    an air breathing, fuel consuming internal combustion engine for producing a power output and having an air intake system and an exhaust system for receiving the products of combustion;
    a turbomachine having at least a turbine over which products of combustion pass and comprising a shaft and an impeller fixed to said shaft, said turbomachine comprising a bearing system between said shaft and said bearing housing, said turbomachine having a seal between said shaft and said housing and said impeller, said turbomachine further comprising a heat shield adjacent to the back wall of said housing;
    an exhaust aftertreatment system receiving the products of combustion from said turbine and having at least a catalyst;
    and a device periodically introducing hydrocarbons adjacent said turbomachine turbine and through said housing so that the heat of said turbine vaporizes the hydrocarbons whereby the products of combustion entering said exhaust aftertreatment system are substantially immediately available to interact with said catalyst and wherein a passage for said hydrocarbons extends through said bearing housing to an opening between said shaft seal and said turbine impeller.

2. An internal combustion engine system as claimed in claim 1, wherein said turbine housing has a lubricated bearing system within said housing and said hydrocarbons are introduced to said turbine through said housing.

3. An internal combustion engine system as claimed in claim 1, wherein said turbomachine comprises a compressor driven by said turbine.

4. An internal combustion engine system as claimed in claim 3, wherein said compressor and turbine are on a common shaft and said housing has a bearing system for said shaft including a lubrication system and wherein said hydrocarbon is introduced through said bearing housing.

5. An internal combustion engine system as claimed in claim 1, wherein said internal combustion engine has a fuel system and said hydrocarbons are directed from said fuel system.

6. An internal combustion engine system as claimed in claim 5, wherein said engine has a passage for fuel from said fuel system to adjacent said turbine and has a valve interposed in said passage for controlling flow of fuel.

7. An internal combustion engine system as claimed in claim 6, wherein said internal combustion engine fuel system has an electronic control unit (ECU) and said valve is controlled by said ECU.

8. An internal combustion engine system as claimed in claim 7, wherein said ECU actuates said valve in response to a signal from the exhaust aftertreatment system.

9. An internal combustion engine system as claimed in claim 1, further comprising a seal between said heat shield and said bearing housing.

10. An internal combustion engine system as claimed in claim 1, wherein said passage extends downward from a hydrocarbon source to said opening.

11. A method of adding hydrocarbons to the exhaust of an air breathing, fuel consuming internal combustion engine having at least a turbine comprising a shaft and an impeller fixed on said shaft and rotatable within a housing and receiving the exhaust from said internal combustion engine, said method comprising the steps of:
periodically directing hydrocarbons through said housing at said shaft whereby it flows outward on said impeller through centrifugal force and into the exhaust for vaporizing said hydrocarbons; and substantially immediately after said turbine, interacting said exhaust with vaporized hydrocarbons with a catalyst to increase the temperature of said exhaust.

12. A method as claimed in claim 11, wherein said hydrocarbon is introduced to said shaft from a source higher than said shaft.

13. A method as claimed in claim 11, wherein a diesel particulate filter receives the output of the exhaust from said catalyst and said hydrocarbon is introduced in response to signals from said diesel particulate filter.

* * * * *